US011174200B2

(12) United States Patent
Yuan et al.

(10) Patent No.: US 11,174,200 B2
(45) Date of Patent: Nov. 16, 2021

(54) STABLE ASPHALT EMULSIONS, METHODS OF FORMING THE SAME, AND COMPOSITE STRUCTURES FORMED FROM THE SAME

(71) Applicant: HONEYWELL INTERNATIONAL INC., Morris Plains, NJ (US)

(72) Inventors: Ruixing Yuan, Shanghai (CN); Yue Wen Liu, Shanghai (CN); Wei Wang, Shanghai (CN); Yuansheng Shen, Shanghai (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 291 days.

(21) Appl. No.: 16/121,381

(22) Filed: Sep. 4, 2018

(65) Prior Publication Data
US 2019/0077710 A1 Mar. 14, 2019

Related U.S. Application Data

(60) Provisional application No. 62/558,191, filed on Sep. 13, 2017.

(51) Int. Cl.
| | |
|---|---|
| C04B 26/26 | (2006.01) |
| C04B 24/26 | (2006.01) |
| C08L 95/00 | (2006.01) |
| E01C 7/24 | (2006.01) |
| E01C 7/32 | (2006.01) |
| E01C 7/35 | (2006.01) |
| C04B 111/00 | (2006.01) |

(52) U.S. Cl.
CPC ............. *C04B 26/26* (2013.01); *C04B 24/26* (2013.01); *C08L 95/00* (2013.01); *E01C 7/24* (2013.01); *E01C 7/32* (2013.01); *E01C 7/325* (2013.01); *E01C 7/358* (2013.01); *C04B 2111/0075* (2013.01); *E01C 7/353* (2013.01)

(58) Field of Classification Search
CPC .......... C08L 95/00; C04B 26/26; C04B 24/26
USPC ....................................................... 106/668
See application file for complete search history.

(56) References Cited

U.S. PATENT DOCUMENTS

| | | | |
|---|---|---|---|
| 3,651,000 A | 3/1972 | Woodruff | |
| 3,740,201 A | 6/1973 | Woodruff | |
| 4,853,427 A * | 8/1989 | Herten | C08L 23/06 524/394 |
| 6,451,885 B1 * | 9/2002 | Dresin | C04B 24/36 106/277 |
| 2011/0041734 A1 | 2/2011 | Guerrini et al. | |
| 2013/0042792 A1 * | 2/2013 | Stuart | C08L 95/005 106/640 |
| 2014/0373750 A1 | 12/2014 | O'Connell et al. | |
| 2016/0201271 A1 | 7/2016 | Clopotel et al. | |
| 2016/0340552 A1 | 11/2016 | O'Connell et al. | |
| 2017/0073531 A1 | 3/2017 | Zhou et al. | |
| 2017/0190618 A1 | 7/2017 | Wang et al. | |

FOREIGN PATENT DOCUMENTS

| | | |
|---|---|---|
| CA | 787330 A | 6/1968 |
| CN | 1058274 C | 11/2000 |
| EP | 3102636 B1 | 5/2020 |
| JP | 61252239 A2 | 11/1986 |
| WO | WO-9907792 A1 * 2/1999 | ............ C08L 95/005 |

OTHER PUBLICATIONS

Zhizong, Liang and Hesp, Simon A.M., "In Situ Steric Stabilization of Polyethylene Emulsions in Asphalt Binders for Hot-Mix Pavement Applications," Colloids and Surfaces A: Physicochemical and Engineering Aspects, 81, Jun. 1993, p. 239-250.

International Searching Authority, International Search Report for Application No. PCT/US2018/050058 dated Jan. 2, 2019.

International Searching Authority, Written Opinion of the International Searching Authority for Application No. PCT/US2018/050058 dated Jan. 2, 2019.

John B. Johnston et al.: "Using Polymer Modified Asphalt Emulsions in Surface Treatments" A Federal Lands Highway Interim Report, Aug. 1, 2008, pp. 1-134, USA.

* cited by examiner

*Primary Examiner* — Deve V Hall
(74) *Attorney, Agent, or Firm* — Lorenz & Kopf, LLP

(57) ABSTRACT

Asphalt emulsions, methods of forming asphalt emulsions, and composite pavement structures formed from the asphalt emulsions are provided herein. In an embodiment, an asphalt emulsion includes a base asphalt component, water, and an oxidized high density polyethylene. The base asphalt component is present in an amount of from about 15 to about 70 weight %, the water is present in an amount of at least about 25 weight %, and the oxidized high density polyethylene is present in an amount of from about 1 to about 20 weight %, where all amounts are based on the total weight of the asphalt emulsion. The oxidized high density polyethylene has an acid value of from about 5 to about 50 mgKOH/g. The asphalt emulsion is free of aggregate and other mineral materials.

18 Claims, 1 Drawing Sheet

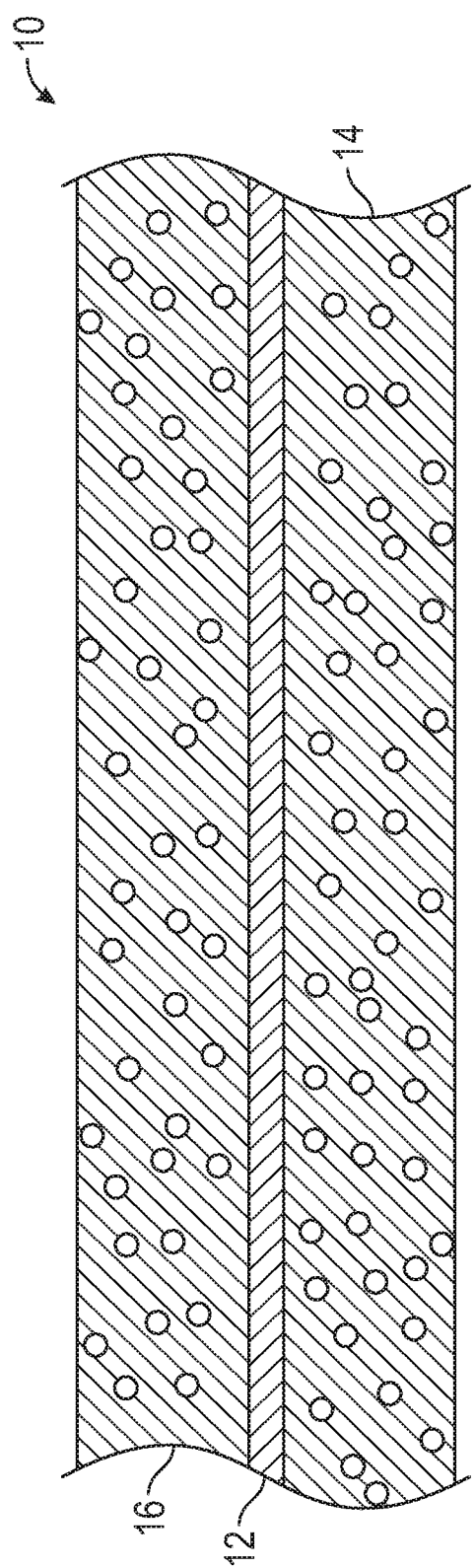

STABLE ASPHALT EMULSIONS, METHODS OF FORMING THE SAME, AND COMPOSITE STRUCTURES FORMED FROM THE SAME

CROSS-REFERENCE TO RELATED APPLICATIONS

This application claims the benefit of U.S. Provisional Application No. 62/558,191, filed Sep. 13, 2017.

TECHNICAL FIELD

The technical field generally relates to asphalt emulsions, methods of forming the asphalt emulsions, and composite structures formed from the asphalt emulsions. More particularly, the technical field relates to asphalt emulsions having excellent stability.

BACKGROUND

Asphalt, or bitumen, is commonly collected or synthesized and refined for use in applications such as paving, roofing, sealing, and water-proofing applications. Asphalt, often referred to as "asphalt binder" or "asphalt cement", is often mixed with aggregate to form material used in asphalt paving. To effectively mix the asphalt with the aggregate material, the asphalt is often provided in an asphalt emulsion that is free of aggregate. Asphalt emulsions are also employed in applications that do not involve mixing with aggregate, i.e., the asphalt emulsions themselves may be employed for end applications such as to form a tack coat layer or other aggregate-free layers in a composite paving structure such as fog seal, primer layers, chip seal, slurry seal, and the like. Particularly, composite paving structures generally include multiple aggregate-containing asphalt layers, with each succeeding layer bonded to an underlying layer through a tack coat layer. The tack coat layer effectively promotes adhesion and/or fusion between the aggregate-contain asphalt layers. The tack coat layer may also contribute to wear and/or weather resistance features of the composite paving structures.

Insufficient adhesion between a new aggregate-containing asphalt layer and an existing aggregate-containing asphalt layer, i.e., a previously laid pavement layer or a prepared pavement surface, can cause pavement separation and cracking during construction of the composite paving structure, as well as subsequent failures and premature deterioration of the composite paving structure and/or surface. Such conditions often require costly repairs, can cause damage to vehicles traveling on the surface, and may cause dangerous traffic conditions threatening damage to property and injury to vehicle passengers. Therefore, the tack coat layer desirably promotes maximized adhesion between the adjacent aggregate-containing asphalt layers. Properties of the tack coat layer, such as pull strength and softening point, provide an objective measure of how well the tack coat layer can adhere adjacent aggregate-containing asphalt layers.

Because the tack coat layer is formed on the existing aggregate-containing asphalt layer, construction or other vehicles may travel over the tack coat layer prior to subsequent formation of the new aggregate-containing asphalt layer on the tack coat layer. Oftentimes, the tack coat layer is damaged by such exposure due to pick-up on tires or tracks of vehicles traveling over the tack coat layer. Where such damage occurs, the picked-up material from the tack coat layer can be deposited onto other surfaces of the pavement composite, causing collateral problems in other areas. Further, the damaged areas of the tack coat layer exhibit reduced effectiveness vis-à-vis promoting adhesion between the aggregate-containing asphalt layers, resulting in the aforementioned reveling concerns. Therefore, tack coat layers, as well as other layers as formed in the composite paving structures that are subject to direct contact with vehicle tires or tracks during construction of the composite paving structures, desirably exhibit excellent trackless adhesion properties.

To improve upon the various physical properties of tack coat layers in terms of trackless adhesion, softening point, and pull strength, various polymeric additives have been employed. For example, copolymers such as styrene-butadiene rubber (SBR) and styrene butadiene styrene (SBS) are known to improve such properties. Additionally, other polymeric additives such as polyethylene have been included in asphalt compositions to improve trackless adhesion and anti-rutting properties of composite paving structures.

The asphalt emulsions that are employed to form the tack coat layers, as well as the other layers referenced above, may be prepared through a variety of techniques to provide a liquid, flowable fluid. For example, asphalt emulsions may be prepared by heating compositions that primarily include asphalt above a melting temperature of the asphalt. Such techniques generally avoid the use of significant amounts of solvent that would be required to maintain the emulsions in liquid form at temperatures below the melting temperature of the asphalt. Further, such techniques minimize instability concerns that are prevalent when polymeric additives are included in the asphalt emulsions. Alternatively, asphalt may be dissolved in solvents or emulsified in water to form the asphalt emulsions that are in liquid form at temperatures that are below the melting temperature of the asphalt. However, asphalt emulsions in water are notoriously unstable, especially when polymeric additives are included, and exhibit significant asphalt delta in solids content between a top of the asphalt emulsion and a bottom of the asphalt emulsion over relatively short periods of time, e.g., at 1 day or 5 days after emulsification.

Significant efforts have been made to improve storage stability of asphalt emulsions that employ water as a solvent and that include polymeric additives such as polyethylene. However, many such efforts do not provide sufficient storage stability, require additional components to achieve acceptable stability, require special mixing apparatuses, or result in compromise of other physical properties of the resulting asphalt layer.

Accordingly, it is desirable to provide asphalt emulsions that include appreciable amounts of water and that exhibit excellent stability, as well as methods of forming such stable asphalt emulsions and composite paving structures that are formed from the stable asphalt emulsions. In addition, it is desirable to provide asphalt emulsions that, while exhibiting excellent stability, further provide layers in composite pavement structures that have excellent physical properties such as trackless adhesion, pull adhesion, and high softening point. Furthermore, other desirable features and characteristics will become apparent from the subsequent detailed description and the appended claims, taken in conjunction with the accompanying drawings and this background.

BRIEF SUMMARY

Asphalt emulsions, methods of forming asphalt emulsions, and composite pavement structures formed from the asphalt emulsions are provided herein. In an embodiment, an asphalt emulsion includes a base asphalt component, water, and an oxidized high density polyethylene. The base asphalt component is present in an amount of from about 15% to about 70% weight %, the water is present in an amount of at least about 25 weight %, and the oxidized high density polyethylene is present in an amount of from about 1 to about 20 weight %, where all amounts are based on the total weight of the asphalt emulsion. The oxidized high density polyethylene has an acid value of from about 5 to about 50 mgKOH/g. The asphalt emulsion is free of aggregate and other mineral materials.

In another embodiment, a method of forming an asphalt emulsion includes forming a base asphalt emulsion that includes a base asphalt component and water. An oxidized polyethylene emulsion is formed separate from the base asphalt emulsion. The oxidized polyethylene emulsion includes an oxidized high density polyethylene and water. The oxidized high density polyethylene has an acid value of from about 5 to about 50 mgKOH/g. The base asphalt emulsion and the oxidized polyethylene emulsion are combined to form the asphalt emulsion. The asphalt emulsion includes the base asphalt component present in an amount of from about 15% to about 70% weight %, water present in an amount of at least about 25 weight %, and the oxidized high density polyethylene present in an amount of from about 1 to about 20 weight %, wherein all amounts are based on the total weight of the asphalt emulsion. The asphalt emulsion is free of aggregate and other mineral materials.

In another embodiment, a composite pavement structure includes an underlying aggregate-containing asphalt layer and an emulsion-derived asphalt layer disposed directly on and over the underlying aggregate-containing asphalt layer. The emulsion-derived asphalt layer is formed from an asphalt emulsion including a base asphalt component, water, and an oxidized high density polyethylene. The base asphalt emulsion is present in an amount of from about 15% to about 70% weight %, the water is present in an amount of at least about 25 weight %, and the oxidized high density polyethylene is present in an amount of from about 1 to about 20 weight %, wherein all amounts are based on the total weight of the asphalt emulsion. The oxidized high density polyethylene has an acid value of from about 5 to about 50 mgKOH/g. The emulsion-derived asphalt layer as-deposited is free of aggregate and other mineral materials.

BRIEF DESCRIPTION OF THE DRAWINGS

The various embodiments will hereinafter be described in conjunction with the following drawing FIGURES, wherein like numerals denote like elements, and wherein:

FIG. 1 is a cross-sectional side view of a composite pavement structure in accordance with an embodiment.

DETAILED DESCRIPTION

The following detailed description is merely exemplary in nature and is not intended to limit the asphalt emulsions, methods of forming the same, or composite pavement structures formed from the same. Furthermore, there is no intention to be bound by any theory presented in the preceding background or the following detailed description.

The various embodiments contemplated herein relate to asphalt emulsions, methods of forming the asphalt emulsions, and composite pavement structures formed from the asphalt emulsions. The asphalt emulsions have excellent stability despite the presence of polymeric additives and appreciable amounts of water in the asphalt emulsions. In particular, the asphalt emulsions as contemplated herein include water in an amount of at least about 25 weight % and a base asphalt component present in an amount of up to about 65 weight %, with both amounts based on the total weight of the asphalt emulsion. The asphalt emulsions as contemplated herein are free of aggregate or other mineral materials, i.e., aggregate and other mineral materials such as rock, sand, clay, and the like are not intentionally mixed into the asphalt emulsions during preparation of the emulsions or prior to depositing the asphalt emulsions on a base substrate and, to the extent that such materials may be included in the asphalt emulsions (e.g., due to field conditions), such materials are only present in trace amounts of less than about 1 percent by weight based upon a total weight of the asphalt emulsions. To provide the excellent stability, the asphalt emulsions as contemplated herein include oxidized high density polyethylene (OxHDPE) that has an acid value of from about 5 to about 50 mgKOH/gm, with acid value of the OxHDPE found to have a direct impact on stability of the asphalt emulsions. With the OxHDPE having the recited acid value, the excellent stability of the asphalt emulsion can be attained while also enabling formation of various structures therefrom that have excellent physical properties attributable to the presence of oxidized polyethylene such as trackless adhesion, pull adhesion, and high softening point. For example, the asphalt emulsions may be employed to form a layer such as a tack coat layer, a fog seal, a primer layer, a chip seal, a micro surface layer, a slurry seal, or the like. The combination of emulsion stability and physical properties of the resulting layer formed from the emulsions can even be achieved with additional polymeric components beyond the OxHDPE present in the asphalt emulsions.

As alluded to above, the asphalt emulsions include the base asphalt component, water, and OxHDPE. As also alluded to above, the asphalt emulsion is free of aggregate and other mineral materials. As referred to herein, "aggregate" is a collective term for mineral materials, such as, for example, sand, gravel, or crushed stone. Further, the asphalt emulsions are liquid, i.e., flowable, at ambient temperatures of about 21° C. As such, in many embodiments, such as for tack coat layer, a fog seal, a primer layer, a chip seal, a slurry seal, or the like, the asphalt emulsions as described herein are not formulated as a binder for aggregate-containing asphalt compositions. However, it is to be appreciated that in some embodiments, such as for a micro surface layer, the asphalt emulsions may be formulated to mix with aggregate but are still flowable at ambient temperature.

The base asphalt component, as referred to herein, is neat asphalt that is free of polymers. The neat asphalt is often a byproduct of petroleum refining or post refining operations and includes air-blown asphalt, blended asphalt, cracked or residual asphalt, petroleum asphalt, propane asphalt, straight-run asphalt, thermal asphalt, and the like. Examples of suitable base asphalt components include those having a penetration value, or "PEN", of from about 60 to about 100 dmm, as measured in accordance with T0604-2011. In embodiments, the base asphalt component is present in the asphalt emulsion in an amount of from about 15 to about 70 weight %, such as from about 45 to about 65 weight %, based on the total weight of the asphalt emulsion.

Water is present in the asphalt emulsion in an amount of at least about 25 weight %, such as from about 30 to about 65 weight %, or such as from about 40 to about 65 weight %, based on the total weight of the asphalt emulsion. Such amounts of water are sufficiently high to render the asphalt emulsion liquid, or flowable, at ambient temperatures of about 21° C. Such amounts of water also present stability concerns that have traditionally been difficult to address in asphalt emulsions that include polyethylene, with such concerns documented in the literature.

The OxHDPE that is included in the asphalt emulsion can include one or more different types of oxidized high density polyethylene. As referred to herein, "high density" polyethylene includes polyethylene having a density in excess of 0.95 g/cm$^3$, such as polyethylenes having a density of from about 0.97 to about 1.01 g/cm$^3$. OxHDPE is known to provide beneficial properties to asphalt compositions when used in various layers of a composite pavement structure. For example, it has been suggested that OxHDPE may assist with anti-rutting performance. As described in further detail below, layers formed from the asphalt emulsions as contemplated herein that include the OxHDPE exhibit excellent pull strength, owing to the presence of the OxHDPE.

As contemplated herein, suitable OxHDPE has an acid value of from about 5 to about 50 mgKOH/g, such as from about 15 to about 40 mgKOH/g, or such as from about 26 to about 35 mgKOH/g. The acid value is indicative of a degree of oxidation of the OxHDPE, e.g., carboxyl group content. The acid value may be determined by titrating a solution of the OxHDPE with a 0.1 N alcoholic potassium hydroxide (KOH) solution to a visual "pink" end point using phenolphthalein as an indicator in accordance with conventional techniques. It has been found, as shown in the Examples below, that acid value of the OxHDPE has a direct impact on storage stability of the asphalt emulsions, and OxHDPE having the acid value within the aforementioned ranges enables the desirable physical properties of asphalt emulsions that include OxHDPE to be realized while also remediating storage stability concerns that have heretofore been observed with asphalt emulsions that include high amounts of water and polyethylene.

In embodiments, the OxHDPE has a number average molecular weight ($M_n$) of from about 1000 to about 30,000 Daltons, such as from about 1000 to about 10,000 Daltons. In embodiments, the OxHDPE has a viscosity of from about 100 to about 20000 cP at 150° C. as measured in accordance with ASTM D4402. Examples of suitable OxHDPE include, but are not limited to, Honeywell Titan® 7686, Honeywell Titan® 7608, and Honeywell Titan® 7183 oxidized high-density polyethylene homopolymers, manufactured by Honeywell International Inc., which is headquartered in Morristown, N.J.

In embodiments, the OxHDPE is present in an amount of from about 1 to about 20 weight %, such as from about 1 to about 5 weight %, such as from about 1 to about 3 weight %, or such as from about 1.5 to about 3 weight %, based on the total weight of the asphalt emulsion. As an alternative measure of the amount of OxHDPE in the asphalt emulsion, the OxHDPE may be present in an amount of from about 0.5 to about 10 weight %, such as from about 0.5 to about 2.5 weight %, or such as from about 0.5 to about 1.5 weight %, based upon the combined weight of the oxidized high density polyethylene and base asphalt component in the asphalt emulsion.

The balance of the asphalt emulsion may include conventional additives that are included to enhance physical properties of layers formed from the asphalt emulsion or to enhance physical properties of the asphalt emulsion itself. For example, in an embodiment, the asphalt emulsion further includes a styrene alkadiene copolymer to modify softening point and/or adhesion properties of layers formed from the asphalt emulsions. The styrene alkadiene copolymer may be introduced into the asphalt emulsion along with the base asphalt component, e.g., in a polymer-modified asphalt component. Alternatively, the styrene alkadiene copolymer may be introduced into the asphalt emulsion separate from the base asphalt component. In an exemplary embodiment, the styrene alkadiene copolymer is chosen from styrene butadiene styrene (SBS), styrene butadiene rubber (SBR), or combinations thereof. As an alternative or in addition to the styrene alkadiene copolymer, styrene ethylene butylene styrene (SEBS), styrene isoprene styrene (SIS), polychloroprene, or combinations thereof can be employed. In embodiments, the concentration of the styrene alkadiene copolymer is in the range of from about 0.5 weight % to about 4.0 weight %, based on the total weight of the base asphalt component. Additional optional additives that may be included in the asphalt emulsions include, but are not limited to, emulsifiers, acids, stabilizers, and the like, with the additional optional additives generally present in amounts of less than about 1 weight %, based upon the total weight of the asphalt emulsion, when present.

As alluded to above, the asphalt emulsions as contemplated herein exhibit excellent storage stability. For example, in embodiments, the asphalt emulsions have a 24 hour storage stability at a temperature of about 21° C. of less than about 1 weight %, such as from about 0.1 to about 1 weight %, or such as from about 0.1 to about 0.8 weight %, based upon the total weight of the asphalt emulsion as measured in accordance with T0665-1993 per T0719 2011 in the Industry Standard JTG E20-2011 Specification and Test Methods of Bitumen and Bituminous Mixture for High Engineering, China. Additionally, in embodiments, the asphalt emulsions as contemplated herein have a five day storage stability at a temperature of about 21° C. of less than about 5.0 weight %, such from about 0.1 to about 4.5 weight %, or such as from about 0.1 to about 4.2 weight %, based upon the total weight of the asphalt emulsion as measured in accordance with T0665-1993 per T0719 2011 in the Industry Standard JTG E20-2011 Specification and Test Methods of Bitumen and Bituminous Mixture for High Engineering, China.

An exemplary method of forming the asphalt emulsion, as contemplated herein, will now be described. In accordance with embodiments, a base asphalt emulsion and an oxidized polyethylene emulsion are separately prepared prior to mixing the respective emulsions to form the asphalt emulsion. In particular, the base asphalt emulsion is formed including the base asphalt component and water. In embodiments, the base asphalt emulsion includes the base asphalt component in an amount of from about 20 to about 70 weight % and water in an amount of from about 29 to about 77 weight %, wherein the amounts are based on the total weight of the base asphalt emulsion. To be clear, the base asphalt emulsion is free of the oxidized high density polyethylene. The base asphalt emulsion may be formed at elevated temperatures to effectuate adequate dispersion and mixing of components therein. For example, in embodiments, to form the base asphalt emulsion, the base asphalt component is heated to an elevated temperature of at least 130° C. After forming the base asphalt emulsion, the base asphalt emulsion is cooled to a temperature of less than or equal to about 40° C., such as less than or equal to about 30° C., prior to mixing with the oxidized polyethylene emulsion.

Separate from the base asphalt emulsion, the oxidized polyethylene emulsion is formed. The oxidized polyethylene emulsion includes the OxHDPE and water, with the OxHDPE present in an amount of from about 0.1 to about 40 weight % and water present in an amount of from about 50 to about 90 weight %, wherein the amounts are based on the total weight of the oxidized polyethylene emulsion. To be clear, the oxidized polyethylene emulsion is free of the base asphalt component. The oxidized polyethylene emulsion may be formed at elevated temperatures, e.g., by heating a mixture of the water and the OxHDPE to an elevated temperature of at least 100° C. After forming the oxidized polyethylene emulsion, the oxidized polyethylene emulsion is cooled to a temperature of less than or equal to about 40° C., such as less than or equal to about 30° C., prior to mixing the base asphalt emulsion and the oxidized polyethylene emulsion.

After cooling the base asphalt emulsion and the oxidized polyethylene emulsion, the base asphalt emulsion and the oxidized polyethylene emulsion are combined to form the asphalt emulsion. In embodiments, the base asphalt emulsion and the oxidized polyethylene emulsion are combined at relatively low temperatures, e.g., at a composition temperature of from about 15 to about 25° C. The asphalt emulsion is free of aggregate and other mineral materials, and the asphalt emulsion may be stored or immediately employed to form an appropriate layer in a composite pavement structure.

Referring to FIG. 1, an exemplary composite pavement structure is shown at 10, with the composite pavement structure 10 including an emulsion-derived asphalt layer 12 formed from the asphalt emulsion as described herein. The composite pavement structure 10 includes an underlying aggregate-containing asphalt layer 14, e.g. a conventional base course, that includes aggregate and asphalt. In the embodiment shown in FIG. 1, emulsion-derived asphalt layer 12 is disposed between the underlying aggregate-containing asphalt layer 14 and an overlying layer 16 disposed directly on the emulsion-derived asphalt layer 12. The emulsion-derived asphalt layer 12, as deposited, is free from aggregate. In the embodiment as shown, the overlying layer 16 is an aggregate-containing asphalt layer and is disposed on an opposite side of the emulsion-derived asphalt layer 12 from the underlying aggregate-containing asphalt layer. However, it is to be appreciated that the overlying layer 16 may be free of aggregate, or may be an ultra-thin course in accordance with conventional composite pavement structures. In this embodiment, the emulsion-derived asphalt layer 12 may be a tack coat layer that serves to bind the underlying layer 14 and the overlying layer 16 together, or can be a primer layer. In embodiments, the emulsion-derived asphalt layer 12 has an as-deposited thickness of from about 1.0 to about 4.0 cm. However, it is to be appreciated that in other embodiments, the emulsion-derived asphalt layer 12 may have an exposed surface that is intended for direct contact by vehicles and/or pedestrians traveling on the composite pavement structure 10.

The emulsion-derived asphalt layer 12 exhibits excellent physical properties such as high softening point, pull resistance strength, and trackless adhesion, and thus provides the composite pavement structure 10 with excellent physical properties. For example, in embodiments, the emulsion-derived asphalt layer 12 has a softening point of at least 60° C., such as at least 70° C., as measured in accordance with T0606 per T0719 2011 in the Industry Standard JTG E20-2011 Specification and Test Methods of Bitumen and Bituminous Mixture for High Engineering, China. Higher softening point is generally understood to correlate to increased pull resistance strength. Further, the emulsion-derived asphalt layer 12 exhibits excellent trackless performance, as determined through qualitative testing where an asphaltic felt is dabbed with the asphalt emulsion and heated for 30 minutes at 60° C. The demulsified asphalt emulsions as contemplated herein generally do not remain sticky to the touch of a hand after the period of heating at 60° C. Further still, the emulsion-derived asphalt layer 12 exhibits superior pull strength as compared to conventional tack coat layers, while also exhibiting the superior softening point and with the asphalt emulsions also exhibiting the excellent storage stability.

The following Examples are not to be construed as limiting as other equivalent embodiments will be apparent in view of the present disclosure.

EXAMPLES

Preparation of Base Asphalt Emulsion

Base asphalt emulsions are first prepared that include a base asphalt component, water, and other components as shown below in TABLE I, where all amounts are shown in weight % based on the total weight of the base asphalt emulsion. The base asphalt emulsions are prepared by preparing a polymer-modified asphalt include the base asphalt component and polymeric components as set forth in TABLE I, heating the resulting mixture to a temperature of 160° C., separately combining and heating the remaining components to a temperature of 55° C., and then combining the respective mixtures and mixing the composition in a colloidal mill for a period of from 1 to 2 minutes. The emulsion is then cooled to room temperature of about 21° C.

TABLE I

|  | Base Asphalt Emulsion 1 | Base Asphalt Emulsion 2 | Base Asphalt Emulsion 3 |
| --- | --- | --- | --- |
| Base Asphalt Component | 50.0 | 53.0 | 53.0 |
| Emulsifier 1 | 0.4 | 0.5 | 0.4 |
| Polymer | 8.0 | — | — |
| Polymeric Modifier 1 | 4 | 1.59 | — |
| Polymeric Modifier 2 | — | — | 1.85 |
| Stabilizer 1 | 0.8 | 0.3 | 0.3 |
| Water | 36.6 | 44.31 | 44.15 |
| pH Regulator | 0.2 | 0.3 | 0.3 |

Base asphalt component is AH70#, local Chinese base asphalt, with a penetration at 25° C. of from 60 to 80 (0.1 mm).
Emulsifier 1 is quaternary ammonium salt.
Polymer is hard asphalt.
Polymeric Modifier 1 is styrene butadiene rubber.
Polymeric Modifier 2 is styrene butadiene styrene.
Stabilizer 1 is a solution of calcium chloride and carboxymethyl cellulose ether in a 1:1 weight ratio.
pH Regulator is hydrochloric acid.

Preparation of Oxidized Polyethylene Emulsion

Oxidized polyethylene emulsions are separately prepared that include an oxidized high density polyethylene and other components as shown below in TABLE II, where all amounts are shown in weight % based on the total weight of the oxidized polyethylene emulsion. The oxidized polyethylene emulsions are prepared by sequentially combining all of the ingredients in a pressure vessel, followed by sealing the pressure vessel and heating to a temperature of 145° C. for a period of 20 minutes while mixing. The emulsion is then cooled to room temperature of about 21° C. with continuous stirring.

TABLE II

|  | OxHDPE Emulsion 1 | OxHDPE Emulsion 2 | OxHDPE Emulsion 3 |
| --- | --- | --- | --- |
| OxHDPE 1 | 24.4 | — | — |
| OxHDPE 2 | — | 24.4 | — |

TABLE II-continued

|  | OxHDPE Emulsion 1 | OxHDPE Emulsion 2 | OxHDPE Emulsion 3 |
|---|---|---|---|
| OxHDPE 3 | — | — | 24.4 |
| Emulsifier 2 | 9.8 | 9.8 | 9.8 |
| Acid | 2.4 | 2.4 | 2.4 |
| Stabilizer 2 | 0.3 | 0.3 | 0.3 |
| Water | 63.1 | 63.1 | 63.1 |

OxHDPE 1 is Honeywell Titan ® 7686 having a density of 0.99 g/cm$^3$ and an acid value of 25 mgKOH/g.
OxHDPE 2 is Honeywell Titan ® 7608 having a density of 0.99 g/cm$^3$ and an acid value of 28-32 mgKOH/g.
OxHDPE 3 is Honeywell Titan ® 7183 having a density of 0.93 g/cm$^3$ and an acid value of 14-17 mgKOH/g.
Emulsifier 2 is tallow amine substituted with two ethylenoxy groups.
Acid is glacial acetic acid.
Stabilizer 2 is sodium metabisulfite.

Preparation of Asphalt Emulsion

Various examples and comparative examples of asphalt emulsions are prepared using the prepared base asphalt emulsions and oxidized polyethylene emulsions. The asphalt emulsions are prepared by mixing the base asphalt emulsions and the oxidized polyethylene emulsions for 60 minutes at 600 rpm speed using a low speed mixer. TABLE III provides a listing of the components included in the asphalt emulsions with all amounts in weight % based upon total weight of the asphalt emulsions. TABLE III further provides select physical properties of the asphalt emulsions.

Storage stability at 24 hours and at 5 days was measured in accordance with T0665-1993 per T0719 2011 in the Industry Standard JTG E20-2011 Specification and Test Methods of Bitumen and Bituminous Mixture for High Engineering, China.

Softening point was measured in accordance with T0606 of the Industry Standard JTG E20-2011 Specification and Test Methods of Bitumen and Bituminous Mixture for Highway Engineering, China.

Additional samples of asphalt emulsion are prepared to illustrate the impact of the amount of oxidized polyethylene emulsion on trackless performance. In particular, trackless performance is qualitatively tested whereby an asphaltic felt is dabbed with the asphalt emulsion and heated for 30 minutes at 60° C. in an oven. The resulting demulsified asphalt emulsions are then tested for tackiness by contacting the demulsified asphalt emulsions with a finger and observing whether or not the demulsified asphalt emulsions remain sticky to the touch after the period of heating at 60° C. TABLE IV provides the results of such testing.

TABLE IV

|  | Ex. 11 | Ex. 12 | Ex. 13 | Ex. 14 | Ex. 15 |
|---|---|---|---|---|---|
| Base Asphalt Emulsion 1, pbw | 100 | 100 | 100 | 100 | 100 |
| OxHDPE Emulsion 2, pbw | 5 | 6 | 7 | 8 | 9 |

TABLE III

|  | Ex. 1 | Ex. 2 | Ex. 3 | Ex. 4 | Ex. 5 | Ex. 6 |
|---|---|---|---|---|---|---|
| Base Asphalt Emulsion 1, pbw | 100 | 100 | 100 | 100 | 0 | 0 |
| Base Asphalt Emulsion 2, pbw | 0 | 0 | 0 | 0 | 100 | 100 |
| Base Asphalt Emulsion 3, pbw | 0 | 0 | 0 | 0 | 0 | 0 |
| OxHDPE Emulsion 1, pbw | 10 | 0 | 0 | 0 | 0 | 0 |
| OxHDPE Emulsion 2, pbw | 0 | 10 | 0 | 7 | 10 | 7 |
| OxHDPE Emulsion 3, pbw | 0 | 0 | 10 | 0 | 0 | 0 |
| Storage Stability, 24 hr | 0.9 | 0.8 | 1.3 | 0.4 | — | — |
| Storage Stability, 5 Day | 4.5 | 4.2 | 7.2 | 3 | 2.7 | 3 |
| Softening Point, ° C. | — | — | — | 94 | 76.5 | 71.6 |
| Shear Resistance Strength @ M2, asphalt mixture to asphalt mixture | — | — | — | — | 0.584 | — |

|  | Ex. 7 | Ex. 8 | Ex. 9 | Ex. 10 | Comp. Ex. 1 | Comp. Ex. 2 |
|---|---|---|---|---|---|---|
| Base Asphalt Emulsion 1, pbw | 0 | 0 | 0 | 0 | 0 | 0 |
| Base Asphalt Emulsion 2, pbw | 100 | 0 | 0 | 0 | 100 | 0 |
| Base Asphalt Emulsion 3, pbw | 0 | 100 | 100 | 100 | 0 | 100 |
| OxHDPE Emulsion 1, pbw | 0 | 0 | 0 | 0 | 0 | 0 |
| OxHDPE Emulsion 2, pbw | 5 | 10 | 7 | 5 | 0 | 0 |
| OxHDPE Emulsion 3, pbw | 0 | 0 | 0 | 0 | 0 | 0 |
| Storage Stability, 24 hr | — | — | — | — | — | — |
| Storage Stability, 5 Day | 2.6 | 3.8 | 3.7 | 3.8 | 2.5 | 3.4 |
| Softening Point, ° C. | 65.2 | 89 | 80.3 | 71.2 | 52.6 | 62.2 |
| Shear Resistance Strength @ M2, asphalt mixture to asphalt mixture | — | 0.588 | — | — | 0.372 | 0.508 |
| Shear Resistance Strength @ M2, steel plate to steel plate | — | 0.158 | — | — | — | 0.096 |
| Pull Strength @ 0.6 l/M2 | — | 0.26 | — | — | — | 0.14 |

TABLE IV-continued

|  |  |  |  |  |  |
|---|---|---|---|---|---|
| Ductility @ 15° C. | >100 | >100 | >100 | 89.5 | 75.2 |
| Tackiness @ 50° C. | Yes | No | No | No | No |
| Tackiness @ 60° C. | Yes | Yes | No | No | No |
| Tackiness @ 70° C. | Yes | Yes | No | No | No |
| Storage Stability, 5 Day | 4 | 4.1 | 4.2 | 4.2 | 4.1 |

|  | Ex. 16 | Ex. 17 | Ex. 18 | Ex. 19 | Ex. 20 |
|---|---|---|---|---|---|
| Base Asphalt Emulsion 3, pbw | 100 | 100 | 100 | 100 | 100 |
| OxHDPE Emulsion 2, pbw | 5 | 6 | 7 | 8 | 9 |
| Ductility @ 15° C. | — | — | — | — | — |
| Tackiness @ 50° C. | Yes | No | No | No | No |
| Tackiness @ 60° C. | Yes | Yes | No | No | No |
| Tackiness @ 70° C. | Yes | Yes | No | No | No |
| Storage Stability, 5 Day | — | — | — | — | — |

Ductility was measured in accordance with T0605 of the Industry Standard JTG E20-2011 Specification and Test Methods of Bitumen and Bituminous Mixture for Highway Engineering, China.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. An asphalt emulsion comprising:
a base asphalt component present in an amount of from about 45 to about 65 weight %, based on the total weight of the asphalt emulsion;
water present in an amount of at least about 25 weight %, based on the total weight of the asphalt emulsion;
an oxidized high density polyethylene present in an amount of from about 1 to about 20 weight %, based on the total weight of the asphalt emulsion;
wherein the oxidized high density polyethylene has an acid value of from about 5 to about 50 mgKOH/g; and
wherein the asphalt emulsion is free of aggregate and other mineral materials.

2. The asphalt emulsion of claim 1, wherein the oxidized high density polyethylene has an acid value of from about 15 to about 40 mgKOH/g.

3. The asphalt emulsion of claim 1, wherein the oxidized high density polyethylene has an acid value of from about 26 to about 35 mgKOH/g.

4. The asphalt emulsion of claim 1, wherein the oxidized high density polyethylene is present in an amount of from about 0.5 to about 10 weight %, based upon the combined weight of the oxidized high density polyethylene and base asphalt component in the asphalt emulsion.

5. The asphalt emulsion of claim 1, wherein the oxidized high density polyethylene has a density of from about 0.97 to about 1.01 g/cm3.

6. The asphalt emulsion of claim 1, further comprising a styrene alkadiene copolymer.

7. The asphalt emulsion of claim 1, having a 24 hour storage stability at a temperature of about 21° C. of less than about 1.5 weight %, based upon the total weight of the asphalt emulsion.

8. The asphalt emulsion of claim 1, having a five day storage stability at a temperature of about 21° C. of less than about 5.0 weight %, based upon the total weight of the asphalt emulsion.

9. A method of forming an asphalt emulsion, wherein the method comprises the steps of:
forming a base asphalt emulsion comprising a base asphalt component and water;
forming an oxidized polyethylene emulsion separate from the base asphalt emulsion, wherein the oxidized polyethylene emulsion comprises an oxidized high density polyethylene and water, and wherein the oxidized high density polyethylene has an acid value of from about 5 to about 50 mgKOH/g; and
combining the base asphalt emulsion and the oxidized polyethylene emulsion to form the asphalt emulsion, wherein the asphalt emulsion comprises the base asphalt component present in an amount of from about 45 to about 65 weight %, water present in an amount of at least about 25 weight %, and the oxidized high density polyethylene present in an amount of from about 1 to about 20 weight %, wherein all amounts are based on the total weight of the asphalt emulsion, and wherein the asphalt emulsion is free of aggregate and other mineral materials.

10. The method of claim 9, wherein forming the base asphalt emulsion comprises forming the base asphalt emulsion comprising the base asphalt component in an amount of from about 20 to about 70 weight % and water in an amount of from about 29 to about 77 weight %, wherein the amounts are based on the total weight of the base asphalt emulsion, and wherein the base asphalt emulsion is free of the oxidized high density polyethylene.

11. The method of claim 9, wherein forming the oxidized polyethylene emulsion comprises forming the oxidized polyethylene emulsion comprising from about 0.1 to about 40 weight % of the oxidized high density polyethylene and from about 50 to about 90 weight % water, wherein the amounts are based on the total weight of the oxidized polyethylene emulsion, and wherein the oxidized polyethylene emulsion is free of the base asphalt component.

12. The method of claim 9, wherein combining the base asphalt emulsion and the oxidized polyethylene emulsion comprises combining the base asphalt emulsion and the oxidized polyethylene emulsion at a composition temperature of from about 15 to about 25° C.

13. The method of claim 9, wherein:
forming base asphalt emulsion comprises heating the base asphalt component to an elevated temperature of at least 130° C.; and
forming the oxidized polyethylene emulsion comprises heating a mixture of the water and the oxidized high density polyethylene to an elevated temperature of at least 100° C.

14. The method of claim 13, further comprising cooling the base asphalt emulsion and the oxidized polyethylene emulsion to a temperature of less than or equal to about 40° C. prior to mixing the base asphalt emulsion and the oxidized polyethylene emulsion.

15. A composite pavement structure comprising:
an underlying aggregate-containing asphalt layer; and
an emulsion-derived asphalt layer disposed directly on and over the underlying aggregate-containing asphalt layer, wherein the emulsion-derived asphalt layer is formed from an asphalt emulsion comprising:
a base asphalt component present in an amount of from about 45 to about 65 weight %, based on the total weight of the asphalt emulsion;
water present in an amount of at least about 25 weight %, based on the total weight of the asphalt emulsion;
an oxidized high density polyethylene present in an amount of from about 1 to about 20 weight %, based on the total weight of the asphalt emulsion;
wherein the oxidized high density polyethylene has an acid value of from about 5 to about 50 mgKOH/g; and
wherein the emulsion-derived asphalt layer as-deposited is free of aggregate and other mineral materials.

16. The composite pavement structure of claim 15, further comprising an overlying aggregate-containing asphalt layer disposed directly on the emulsion-derived asphalt layer, wherein the overlying aggregate-containing asphalt layer is disposed on an opposite side of the emulsion-derived asphalt layer from the underlying aggregate-containing asphalt layer.

17. The composite pavement structure of claim 15, wherein the emulsion-derived asphalt layer has an as-deposited thickness of from about 1.0 to about 4.0 cm.

18. The composite pavement structure of claim 15, wherein the emulsion-derived asphalt layer has a softening point of at least 60° C. as measured in accordance with T0606 per T0719 2011 in the Industry Standard JTG E20-2011 Specification and Test Methods of Bitumen and Bituminous Mixture for High Engineering, China.

* * * * *